United States Patent [19]
Reina et al.

[11] Patent Number: 6,137,861
[45] Date of Patent: *Oct. 24, 2000

[54] PORTABLE SELF-CONTAINED X-RAY CASSETTE MAINTENANCE SYSTEM AND METHOD

[75] Inventors: Leo Reina; James Sorgani, both of Cary, Ill.

[73] Assignee: X-Ray Cassette Repair Co. Inc., Cary, Ill.

[*] Notice: Under 35 U.S.C. 154(b), the term of this patent shall be extended for 122 days.

[21] Appl. No.: 08/980,046

[22] Filed: Nov. 26, 1997

[51] Int. Cl.[7] .......................... G03B 42/02; G03B 42/04; A47L 5/28

[52] U.S. Cl. ..................... 378/174; 378/167; 15/323; 15/310; 15/314; 15/1.51; 134/6; 134/21

[58] Field of Search ................... 312/249.8, 209, 312/9.1; 15/310, 314, 323, 1.51; 378/167, 172, 174, 187, 208, 204; 310/1.51, 323; 134/21, 6

[56] References Cited

U.S. PATENT DOCUMENTS

| | | | |
|---|---|---|---|
| 2,832,985 | 5/1958 | Durling | 15/310 |
| 3,401,420 | 9/1968 | Lofgren | 15/323 |
| 3,650,620 | 3/1972 | Hoyt, III | 399/130 |
| 4,514,019 | 4/1985 | Moore | 312/209 |
| 4,989,291 | 2/1991 | Parent | 15/323 |
| 5,238,503 | 8/1993 | Phenix et al. | 134/37 |
| 5,271,123 | 12/1993 | Teske | 15/310 |
| 5,350,228 | 9/1994 | Remington | 312/223.1 |
| 5,493,128 | 2/1996 | Boutet | 250/584 |
| 5,655,253 | 8/1997 | Nevin et al. | 15/310 |

*Primary Examiner*—Robert J. Warden, Sr.
*Assistant Examiner*—Theresa T. Snider
*Attorney, Agent, or Firm*—Niro, Scavone, Haller & Niro

[57] ABSTRACT

A system for cleaning, storing and maintaining x-ray cassettes. The system is used within the environment of an x-ray exposure room for shooting x-ray images of x-ray subjects, and an x-ray dark room for developing x-ray images. The system may include a portable transport, cleaning and storage unit for storing, cleaning and transporting x-ray cassettes. The unit includes a work surface, at least one x-ray cassette receptacle for storing x-ray cassettes, and a vacuum apparatus for vacuuming dust particles from the x-ray cassettes and the unit.

29 Claims, 1 Drawing Sheet

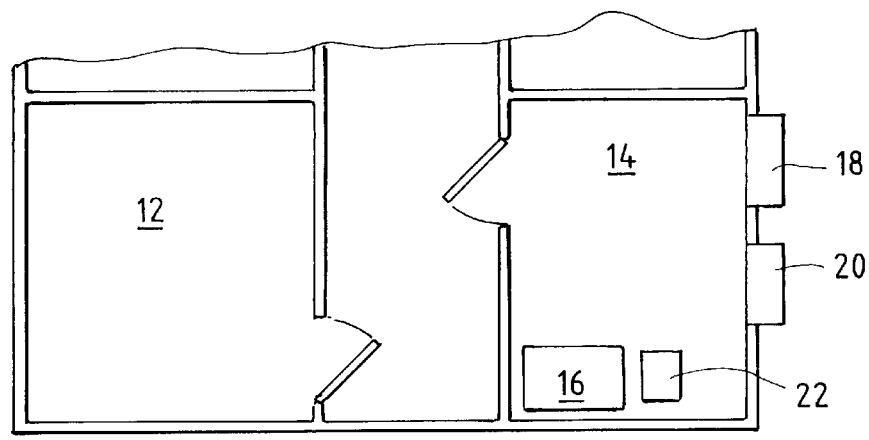
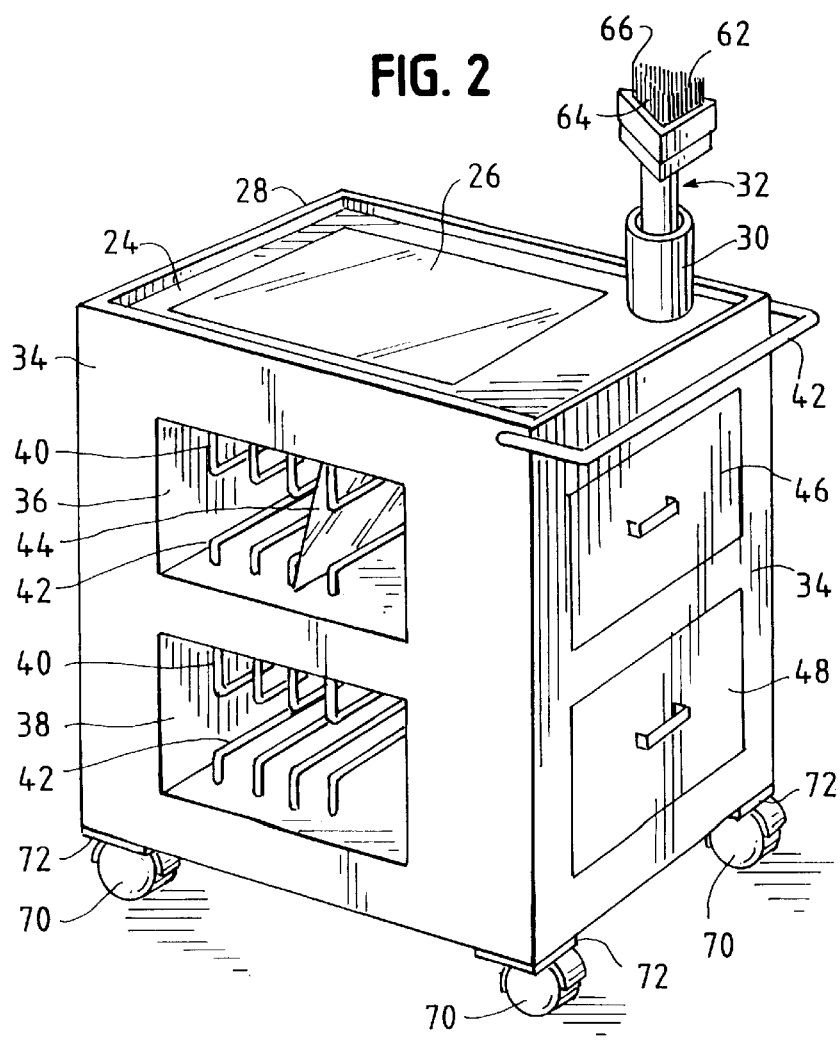
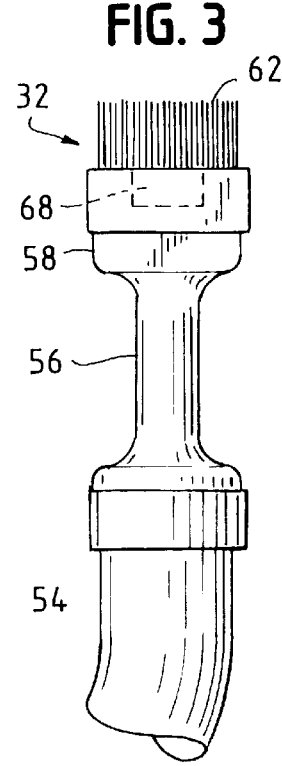

PORTABLE SELF-CONTAINED X-RAY CASSETTE MAINTENANCE SYSTEM AND METHOD

BACKGROUND OF THE INVENTION

The present invention relates to the maintenance of x-ray cassettes and, more particularly, to a system and associated method for cleaning, storing and maintaining x-ray cassettes.

X-ray cassettes are containers typically used in medical facilities to encase x-ray film prior to, during and after exposure. X-ray cassettes typically comprise a book-like body having a hinged side for opening and closing two generally flat sides to place therein, or remove therefrom, an x-ray film. Other x-ray cassettes are made without hinges, comprising two interfitting halves. The cassettes are generally rigid and are usually made of plastic, fiberglass or metal. On the interior of such cassettes, the inside surface of one or both generally flat sides comprises a film screen. In mammography applications, only one of the surfaces comprises a film screen. The inside surface of the other side comprises a "tube side" plate or surface that allows x-rays to pass through. X-ray cassettes are typically designed so that the inside surfaces of the two sides contact each other when the cassette is in a closed position.

In typical use, an x-ray cassette is loaded with x-ray film while in a light-free environment or an x-ray dark room. The cassette is then transported to an x-ray exposure room and positioned by the x-ray technician in a desired location with respect to the x-ray subject for exposure. The film is then exposed to x-rays and a resultant image is stored on the film. The film is then transported, while still in the x-ray cassette, to the light-free environment or x-ray dark room. The film is removed from the cassette and developed into a viewable radiograph.

After developing, the empty cassette is available for re-use. While in the light-free environment or dark room, the x-ray cassette is loaded with a new, undeveloped film. The film will remain stored in the cassette until it is exposed and developed. The cassette provides protection to the x-ray intensifying screen and film from physical damage such as scratching and exposure to such things as light, moisture and dust.

When x-ray cassettes become worn or damaged, they are less effective for maintaining x-ray film damage-free and dust-free. The environment in such places as conventional radiology departments and emergency room x-ray areas sometimes subjects x-ray cassettes to rough handling or other causes of damage. X-ray cassettes can become bent, cracked or otherwise physically damaged, diminishing performance in the protection and clean maintenance of the cassette intensifying screens and film. Damaged cassettes must either be repaired or replaced. Either course of action results in high costs.

Periodic cleaning of x-ray cassettes and other x-ray equipment is ordinarily carried out to remove dust and other contaminants from places in which they are likely to cause damage and radiographic abnormalities such as film artifacts. The accumulation of dust on various equipment and surfaces presents a problem in the integrity of images produced on x-ray film. Typical measures for removing dust or other contamination include periodically wiping x-ray cassettes with a specialized cloth and applying a cleaning solution, or brushing with a specialized brush. Other measures include applying anti-static substances to various surfaces and equipment, applying anti-static coatings to various surfaces, or constructing various equipment from anti-static materials. While conventional measures remove some dust and contaminants from x-ray equipment, some dust particles remain. Such remaining dust usually comprises small or fine particles. In certain x-ray imaging situations, fine dust particles have little or no detrimental effect.

Small particles of dust, while negligible in many x-ray applications, create a problem in certain specialized or high resolution x-ray applications, including mammography. When dust particles are inside an x-ray cassette, they can distort or block images in developed x-ray films. Dust particles can appear on a developed image in the form of an unidentifiable object or they can be mistaken for other objects or bodies. This can result in misdiagnosis or high cost due to the need for re-takes in x-ray images, as well as unnecessary radiation exposure to the patient. There are no known effective systems and associated procedures for removing and preventing accumulation of dust, including fine particle dust, in x-ray cassettes.

Most radiology facilities have x-ray cassette storage facilities. Typical storage facilities consist of simple shelves in a storage area or room. The storage areas usually do not provide effective means for preventing or avoiding the accumulation of dust particles on or in x-ray cassettes. In use, x-ray cassettes are usually left laying around on tables in radiology departments, where they are subject to damage from physical mishandling or dropping. In transport from the x-ray dark room to the exposure room they are often carried in a stack by hand. In such an environment, cassettes are also subject to developing static charges through frictional contact with various surfaces, including other cassettes, whereby the static charges promote the attraction and retention of dust.

It is an objective of the present invention to provide a physical system and associated method for cleaning, storing and maintaining x-ray cassettes in good repair and in an essentially dust-free condition. Other objectives will become apparent in the following specification.

SUMMARY OF THE INVENTION

The present invention system and method for storing, cleaning and maintaining x-ray cassettes comprises novel hardware and procedures as now summarized.

The system of the present invention comprises an exposure area or room for shooting x-ray images; an x-ray dark room for developing x-ray images and for loading and unloading x-ray cassettes; and a portable x-ray cassette storage, cleaning and transport station.

The method of the present invention includes the steps of: cleaning an x-ray cassette using the novel station and associated techniques of the present invention while in the dark room; storing the x-ray cassette in the novel station; transporting the cassette to the exposure room while it is stored in the novel station; removing the cassette from the novel station; creating an image on the film in the cassette using a conventional x-ray apparatus; replacing the x-ray cassette in the novel station; transporting the cassette back to the dark room while it is stored in the novel station; removing the cassette from the novel station; removing the film slide from the cassette and developing the x-ray image on the slide; cleaning the x-ray cassette using the novel station and associated techniques; and loading the cleaned x-ray cassette with a new film slide while still in the dark room.

BRIEF DESCRIPTION OF THE DRAWINGS

FIG. 1 is a schematic, plan view of a system or the present invention.

FIG. 2 is a perspective view of a portable x-ray cleaning, maintenance and storage station which is a component of the present invention.

FIG. 3 is a front view of a vacuum head which is a component of the present invention.

DETAILED DESCRIPTION OF THE DRAWINGS

System Structure

In FIG. 1 there is schematically shown a system (10) comprising an x-ray exposure room (12), an x-ray dark room (14), and a portable x-ray cleaning, maintenance and storage station (16).

The exposure room (12) comprises generally a room or enclosed area equipped with conventional x-ray equipment for supporting the x-ray subject and for creating x-ray images. The exposure room (12) is kept generally clean and free from substantial amounts of dust and debris. Conventional air filters and air ionizing devices can be employed to achieve this result. Another optional measure to remove dust and maintain a generally dust free environment is to maintain the air pressure within the exposure room (12) at a higher level than the surrounding rooms in order to minimize the influx of outside air carrying dust or debris.

The x-ray dark room (14) comprises a room or enclosed area equipped with conventional x-ray developing equipment. Preferably, the dark room (14) is equipped with one or more air filters (18) and one or more ionizers (20). The dark room may also include one or more conventional anti-static floor mats (22) to discharge dust-attracting static charges from a technician or operator.

The portable x-ray cleaning, maintenance and storage station (16), as illustrated in FIG. 1, comprises a generally horizontal work surface (24). The work surface (24) may be treated with a conventionally known anti-static coating or finish to prevent dust attraction and retention. Preferably, the work surface (24) is fitted with an anti-static mat (26) that can be selectively placed on or removed from the work surface (24). It is further desirable, though not required, to provide a short perimeter wall (28) to prevent the anti-static mat (26), tools or other materials from inadvertently sliding off of the work surface (24). The work surface (24) may also be provided with an opening (30) to accommodate a retractable vacuum head (32), which is a novel aspect of the present invention and will be described below. The portable station (16) further comprises sidewalls (34). At least one sidewall (34) is provided with cassette storage receptacles (36, 38) for x-ray cassettes. The number of cassette storage receptacles (36, 38) may vary as desired. In the preferred embodiment there are two cassette storage receptacles (36, 38).

Each cassette storage receptacle (36, 38) has a plurality of top vertical plates (40) and bottom vertical plates (42) extending from the floor and ceiling of the receptacle (36, 38), respectively. The top vertical plates (40) and bottom vertical plates (42) are each spaced apart evenly along the horizontal, and aligned with each other vertically, in order to form vertical slots for receiving x-ray cassettes therein, such as the x-ray cassette (44) shown in FIG. 2. The vertical slots are spaced apart adequately so that x-ray cassettes held in a vertical slot will not touch another x-ray cassette held in another vertical slot. One of the advantages of storing cassettes without having them contact one another is that static charge caused by rubbing two or more cassettes together is eliminated. Also, damage from relative contact is eliminated. While two cassette storage receptacles (36, 38) are shown, it is understood that one or more receptacles can be provided. While the two storage receptacles (36, 38) are shown on a common sidewall (34), it is understood that they can be positioned on any one of the four sidewalls (34). Although the preferred embodiment calls for vertical positioning of the cassettes in storage for ease of handling, it is contemplated that they could be stored in horizontal alignment. If desired, doors or other covers (not shown) could be provided to the receptacle openings to minimize dust entry or generally seal the receptacles from the outside environment.

The preferred embodiment of the present invention further comprises a first and second closed storage compartment (46, 48) for housing such things as cleaning cloths, solutions, and other articles. The storage compartments (46, 48) may be provided with sliding or hinged doors, or no doors. These storage compartments (46, 48) can be used to store such things as identification markers, mammogram test phantoms, and conventional quality control tools. In addition, books or manuals could be stored in the compartments (46, 48).

The portable station (16) is preferably provided with a slide out work surface extension (52). The work surface extension (52) is adapted to be selectively pulled out to serve as an extension of the work surface (24). The work surface extension (52) may be provided as a hinged, fold-out piece instead of a sliding piece as depicted in the preferred embodiment. Two extending pieces may be provided instead of one as in the preferred embodiment.

As illustrated in FIG. 3, a retractable vacuum head (32) is provided. The vacuum head (32) is attached to a flexible hose (54) which passes through the vacuum hose opening (30) in the work surface (24). The other end of the flexible hose (54) is connected to a conventional vacuum body (not shown) encased in the portable station (16) housing and properly vented. The vacuum head (32) comprises a grippable section (56) adapted to be hand-held and a contact portion (58) that is preferably removable and interchangeable.

The contact portion (58) should comprise a soft, flexible material that will not damage the surface of x-ray cassettes or x-ray intensifying screens, or other surfaces that will be vacuumed. In the preferred embodiment, brush bristles (62) forming an enclosed opening are used. The brush bristles (62) of the preferred embodiment are shaped in a triangle to provide not only a flat surface (64) for a wide sweep path, but also a corner (66) for accessing tight corners. Brush bristles enable simultaneous sweeping and soft vacuum head contact. The brush bristles (62) may be of a special type of bristle designed to eliminate static and remove dust. It is desirable to utilize an ionizing element (68) in the form of a strip of material placed near the base of the bristles (62) in order to neutralize a negatively charged surface of the x-ray cassette to remove its dust attracting quality. An example of a brush having bristles and utilizing an ionizing strip is available in the form of the STATICMASTER™ brush available from NRD Inc., Mark IV Industries, Grand Island, N.Y.

While the vacuum body (not shown) is housed within the portable station (16), it is understood that the entire vacuum unit may be completely detached from the portable station (16). Alternatively, the vacuum unit may be attached as a housing externally to the portable station (16) body, or may be stored in one of the storage compartments (46, 48).

The portable work station (16) is provide with wheels (70) for enabling transport. Preferably, at least two or more of the wheels (70) are mounted on swiveling casters (72) to enable directional maneuverability. The wheels (70) should have a soft surface to assure smoothness and, preferably, of a material that will not produce static charge.

The dimensions of the work station (16) should be such that the work surface (24) is positioned a convenient height to enable a technician to be able to work with his or her hands comfortably. Such a height may be in the approximate range of 36–48 inches. All surfaces of the portable unit (16) may be made of rigid plastic or metallic materials, preferably having low static properties. Anti-static coatings and surface treatments can be applied.

Operation

In operation, the system (10) of the present invention is utilized as described below.

An empty x-ray cassette (not shown) is prepared for loading with an unexposed x-ray film (not shown) by a technician or operator in the light-free environment or x-ray dark room (14). Preferably, the technician stands on an anti-static floor mat (26) during preparation in order to eliminate the tendency of the technician to transfer a static charge to the cassette. The technician first utilizes the vacuum head (32) to vacuum all surfaces of the x-ray cassette. The vacuum bristles (66) are brought into contact with the surfaces to be cleaned in order to sweep and to form a generally sealed vacuum contact surface. The technician next wipes the cassette with a suitable cloth and a conventional cleaning solution. The cloth should be changed frequently. After wiping and drying, the cassette is loaded with an unexposed x-ray film. The technician stands next to the portable station (16) and utilizes the work surface (24) to rest the cassette and cleaning implements throughout the procedure. The procedure is repeated for additional cassettes if desired.

The cleaned and loaded x-ray cassette is then placed into one of the storage receptacles (36, 38). When all of the desired cassettes have been prepared and loaded into the portable unit (16), the portable unit (16) is wheeled out of the x-ray dark room (14) and into the x-ray exposure room (12).

In the x-ray exposure room (12), an unexposed film-loaded cassette is removed from the portable station (16) and utilized to take an x-ray image. The exposed cassette is returned to one of the portable station storage receptacles (36, 38). When a desired number of x-ray exposures have been taken, the exposed cassettes, loaded into the portable unit (16), are transported back to the x-ray darkroom (14) via the portable unit (16).

Once returned to the x-ray dark room (14), the exposed x-ray cassettes are removed from the portable unit (16) and the film slides are removed from the cassettes and developed into x-ray images in a conventional manner. The now empty x-ray cassettes can be cleaned again as described above, prior to re-loading with unexposed film.

The work surface (24) and other surfaces of the portable unit (16) should be vacuumed and wiped periodically. In addition, the anti-static mat (26) on the work surface (24) should be replaced or cleaned periodically.

At all times during use, handling and cleaning of the x-ray cassettes, physical contact between the cassettes and any surface other than the work surface (24) or mat (26) should be avoided. Additionally, at all times when the x-ray cassettes are not being utilized in exposure procedures or are not being cleaned, they should remain properly stored in the storage receptacles (36, 38) of the portable unit (16).

Once cleaned again as desired, the x-ray cassettes are loaded again with unexposed film and the procedure described above for handling and transport is repeated.

It is important to the overall procedure and implementation of the system of the preferred embodiment to utilize the measures described above to eliminate or minimize static charge to the portable device (16) surfaces and the x-ray cassettes continuously.

While the preferred embodiment has been herein described, it is understood that variation in the specific details of the preferred embodiment may be realized without departing from the scope of what is presently claimed and deemed novel.

I claim:

1. A system for cleaning, storing and maintaining x-ray cassettes, said system comprising
    an x-ray exposure room for shooting x-ray images of x-ray subjects;
    an x-ray dark room for developing x-ray images;
    a portable transport, cleaning and storage unit for storing, cleaning and transporting x-ray cassettes, said unit including a work surface, at least one x-ray cassette receptacle for storing a plurality of x-ray cassettes in a manner in which said x-ray cassettes do not physically contact each other; and
    a vacuum apparatus for vacuuming dust particles from one or more of said x-ray cassettes and said unit.

2. The system according to claim 1, wherein
    said x-ray dark room includes at least one anti-static floor mat.

3. The system according to claim 1, wherein
    said x-ray dark room includes at least one de-ionizing air conditioner.

4. The system according to claim 1, wherein
    said x-ray dark room includes at least one air filter adapted to remove dust particles.

5. The system according to claim 1, wherein said unit comprises a plurality of said cassette receptacles.

6. The system according to claim 1, wherein
    said work surface is coated with an anti-static coating.

7. The system according to claim 1, wherein
    said work surface is adapted to be fitted with an anti-static mat.

8. The system according to claim 1, wherein
    said x-ray cassette receptacle is provided with a plurality of upward and downward vertically extending members adapted to align and hold a plurality of x-ray cassettes in said receptacle.

9. The system according to claim 1, wherein
    said vacuum apparatus comprises a vacuum head, a vacuum hose, and a vacuum motor;
    said vacuum head being attached to said vacuum hose and being adapted to be hand held in use; and
    said vacuum head being fitted with a soft end-piece.

10. The system according to claim 9, wherein
    said soft end-piece includes bristles.

11. The system according to claim 9, wherein
    said vacuum head comprises an ionizing element.

12. The system according to claim 9, wherein
    said vacuum motor is housed within said unit.

13. The system according to claim 12, wherein said vacuum hose is adapted to pass through and extend from an opening in said work surface.

14. The system according to claim 1, wherein said unit comprises at least one auxiliary storage receptacle.

15. The system according to claim 1, wherein said unit comprises a set of wheels for rolling said unit along a floor surface.

16. A portable storage, cleaning and maintenance unit for x-ray cassettes, said unit comprising a work surface;

at least one x-ray cassette receptacle for storing a plurality of x-ray cassettes in a manner in which said x-ray cassettes do not physically contact each other; and a vacuum apparatus for vacuuming dust particles from one or more of said x-ray cassettes and said unit;

wherein said x-ray cassette receptacle is provided with a plurality of upward and downward vertically extending members adapted to align and hold a plurality of x-ray cassettes in said receptacle.

17. The unit according to claim 16, wherein said unit comprises a plurality of said cassette receptacles.

18. The unit according to claim 16, wherein said work surface is coated with an anti-static coating.

19. The unit according to claim 16, wherein said work surface is adapted to be fitted with an anti-static mat.

20. The unit according to claim 16, wherein said vacuum apparatus comprises a vacuum head, a vacuum hose, and a vacuum motor;

said vacuum head being attached to said vacuum hose and being adapted to be hand held in use; and said vacuum head being fitted with a soft end-piece.

21. The unit according to claim 20, wherein said soft end-piece includes bristles.

22. The unit according to claim 20, wherein said vacuum head comprises an ionizing element.

23. The unit according to claim 20, wherein said vacuum motor is housed within said unit.

24. The unit according to claim 20, wherein said vacuum hose is adapted to pass through and extend from an opening in said work surface.

25. The unit according to claim 16, wherein said unit comprises at least one auxiliary storage receptacle.

26. The unit according to claim 16, wherein said unit comprises a set of wheels for rolling said unit along a floor surface.

27. A method for cleaning, storing, maintaining and utilizing x-ray cassettes, said method comprising the steps of preparing a subject x-ray cassette for exposure of x-ray film contained therein;

loading said subject x-ray cassette into a portable transport, cleaning and storage unit for storing, cleaning and transporting x-ray cassettes, said unit including a work surface, at least one x-ray cassette receptacle for storing a plurality of x-ray cassettes in a manner in which said x-ray cassettes do not physically contact each other, and a vacuum apparatus for vacuuming dust particles from one or more of said x-ray cassettes and said unit;

transporting said unit to an x-ray exposure room;

removing said subject x-ray cassette from said unit;

positioning said subject x-ray cassette for x-ray exposure;

exposing said x-ray film and thereby creating an x-ray image;

re-loading said subject x-ray cassette into said unit;

transporting said unit to an x-ray dark room;

removing said subject x-ray cassette from said unit; and processing said x-ray film to create a viewable x-ray image.

28. The method of claim 27, wherein the step of preparing a subject x-ray cassette for exposure of x-ray film contained therein further comprises the steps of wiping the interior surfaces of said x-ray cassette prior to loading said x-ray film therein; and vacuuming the interior surfaces of said x-ray cassette prior to loading said x-ray film therein.

29. The method of claim 27, wherein said unit is located in said x-ray dark room prior to the step of transporting said unit to said x-ray exposure room.

* * * * *